May 2, 1933.　　　　　K. E. LYMAN　　　　　1,906,984
OIL COOLER AND FILTER
Filed Sept. 12, 1930　　　3 Sheets-Sheet 1
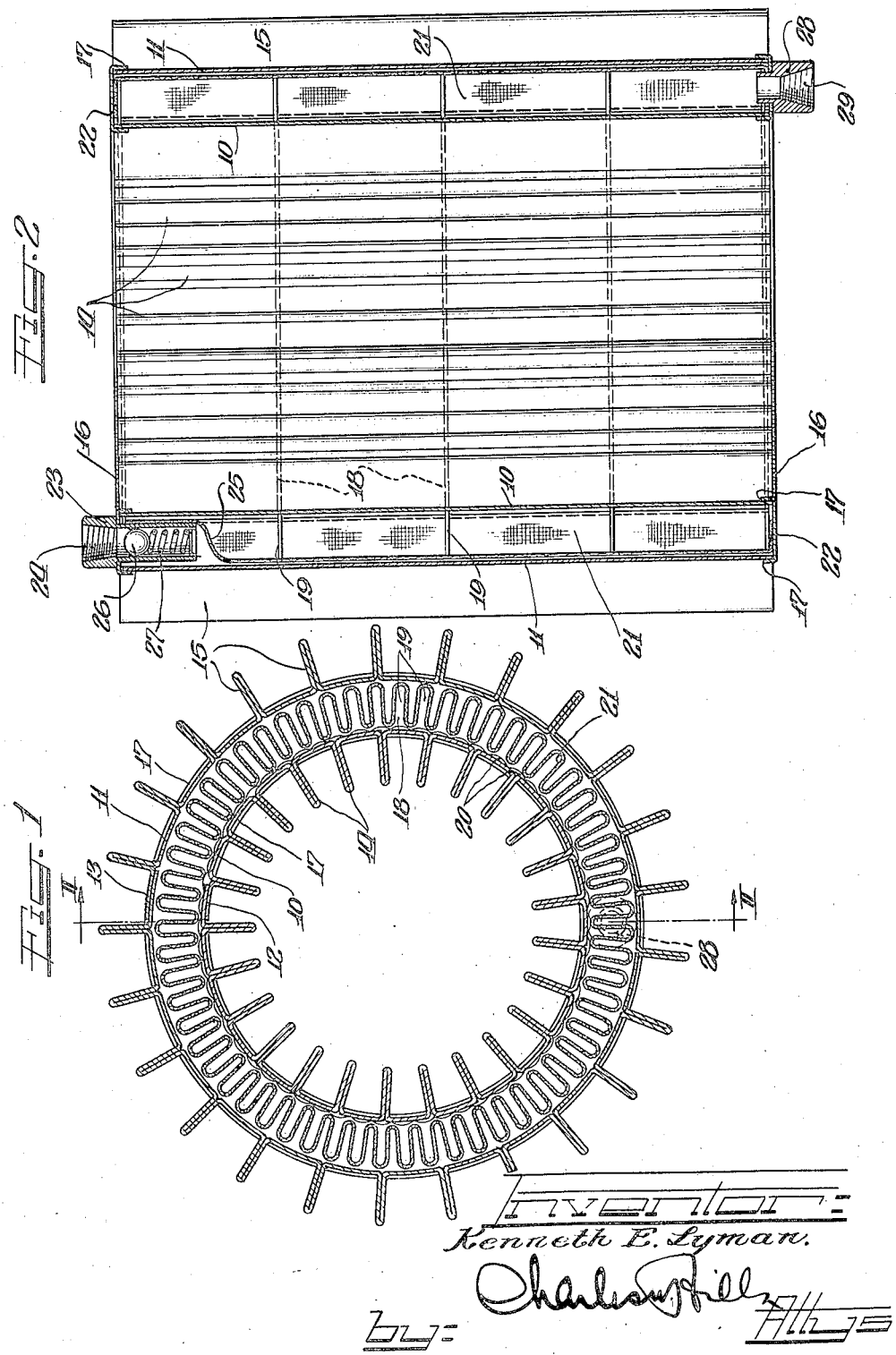

May 2, 1933.　　　　　K. E. LYMAN　　　　　1,906,984
OIL COOLER AND FILTER
Filed Sept. 12, 1930　　3 Sheets-Sheet 2
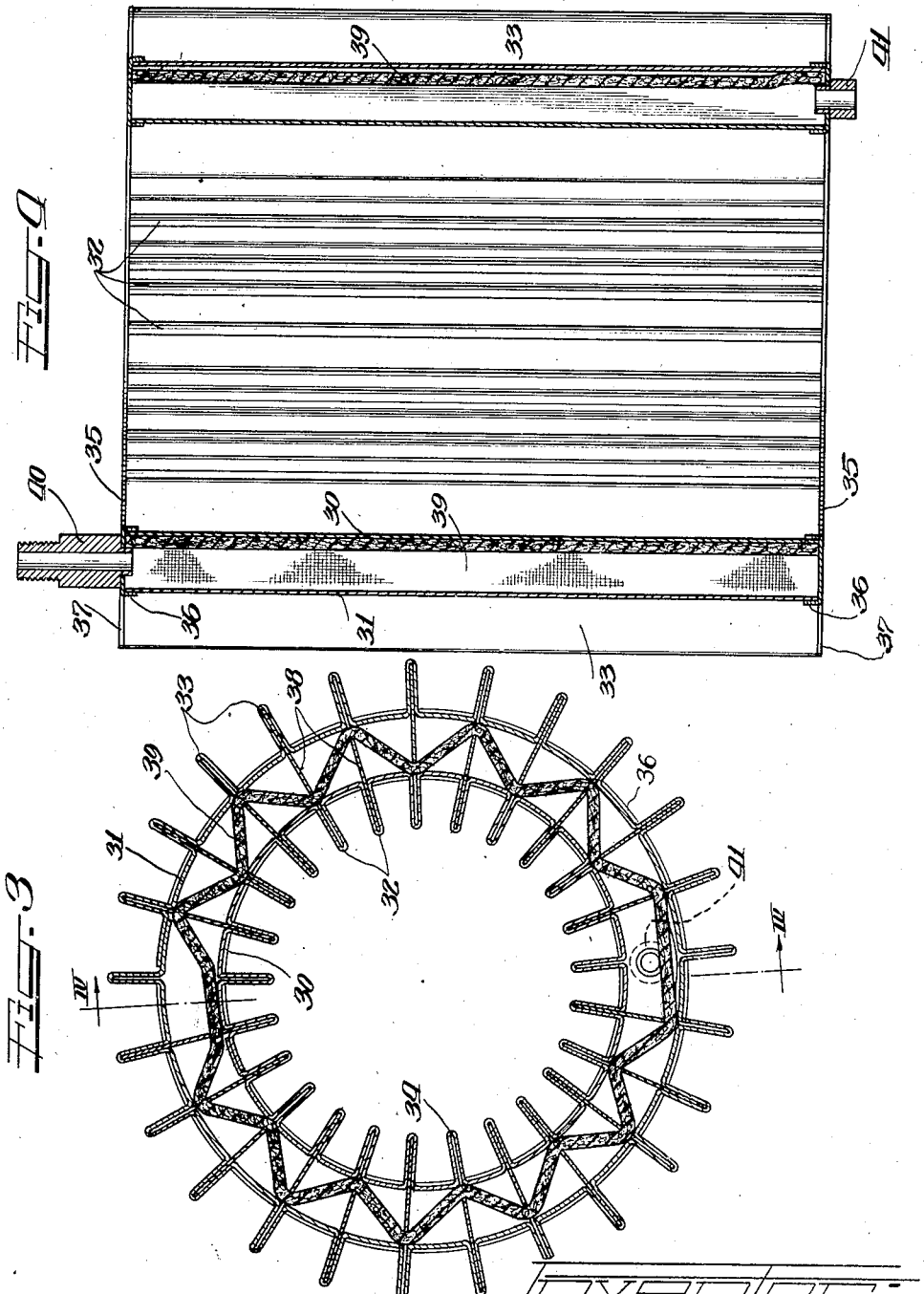

May 2, 1933.    K. E. LYMAN    1,906,984
OIL COOLER AND FILTER
Filed Sept. 12, 1930    3 Sheets-Sheet 3
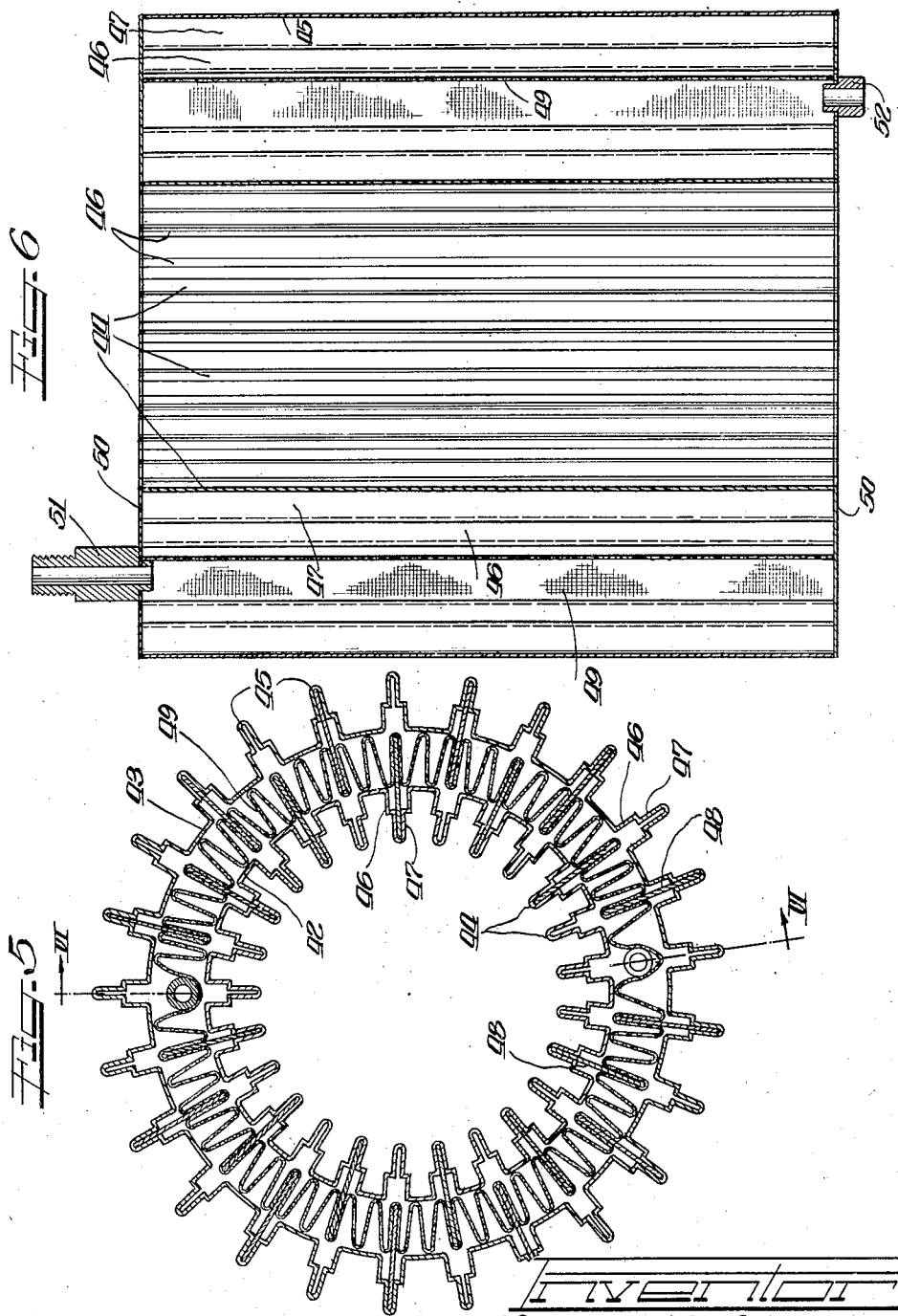

Patented May 2, 1933

1,906,984

UNITED STATES PATENT OFFICE

KENNETH E. LYMAN, OF ROCKFORD, ILLINOIS, ASSIGNOR TO BORG-WARNER CORPORATION, OF CHICAGO, ILLINOIS, A CORPORATION OF ILLINOIS

OIL COOLER AND FILTER

Application filed September 12, 1930. Serial No. 481,394.

This invention relates to improvements in filters for removing dirt, grit, and other impurities or foreign elements from oil or similar fluids, the invention being highly desirable for use in connection with the lubricating system of internal combustion engines, the feeding system for oil burners, and other analogous places, although the invention may have many and various uses and purposes as will be apparent to one skilled in the art.

When a lubricant for an internal combustion engine is filtered, and this is especially true with regard to the filtering of crank case oil in connection with an automobile engine, the oil enters the filtering element at a rather high temperature, and in many instances, this temperature would be sufficiently high to oxidize a fabric such as cotton flannel if this be used as a filtering medium. Since the general trend of this industry at present is towards the use of a filtering device which is hermetically sealed and which is discarded after a certain period of use, the importance of preventing oxidization of the filtering medium is at once apparent, since the filtering medium would become prematurely defective resulting in the discarding of the entire filter unit long before it had performed its allotted service. It is, therefore, important that all the lubricant be cooled as well as filtered, and this invention contemplates the cooling of the lubricant far below the oxidization point of the filtering medium simultaneously with the filtering of the lubricant.

The cooling of the oil in conjunction with the filtering of it is also important from other angles. For example, again dealing with an automobile engine for the purposes of illustration, if the cooling medium of the engine is permitted to fall below the customary quantity and the car is driven in warm weather, the oil therein will be heated to a very high temperature. If this oil is cooled to a material extent, such cooling operation will be reflected in a proportionate cooling of the engine; but further than this, such cooling of the oil will result in a restoration of normal viscosity of the oil in the event the same has been lessened due to the high engine temperature. Accordingly, it is within the contemplation of this invention not only to cool the oil sufficiently to prevent oxidization of the filtering medium, but also to cool the oil to a material and definite extent.

In the past, many and various oil filtering devices have been developed, but the only devices of this tpye of which I am aware that embodied an alleged cooling system utilized means within the filtering element for cooling the oil prior to its engagement with the filtering medium. Such devices performed only an abortive cooling of the oil in that they merely, if at all, cooled the oil just below that temperature which would result in oxidation of the filtering medium, but none of the devices were capable of cooling the oil to an extent sufficient to prevent a gradual oxidation of the filtering medium if the temperature of the internal combustion engine was permitted to rise a reasonable extent above that considered as normal for the particular type of engine.

The present invention has been designed to overcome the above noted as well as other defects and objections in the provision of an oil cooling and filtering device capable of removing foreign particles from the oil and cooling the oil sufficiently not only to prevent oxidization of a filtering fabric but also to restore the viscosity of said oil to normal in case the same has become lessened due to high temperatures.

It is also an object of this invention to provide a filtering unit having considerable exterior surface exposed to the atmosphere whereby heat may be very readily dissipated from the unit and the oil passing therethrough cooled a proportional extent.

It is another object of this invention to provide an oil filtering and cooling unit defined by a pair of spaced walls, of which the inner wall also defines a region open to the atmosphere, the filtering medium being arranged in the space between the walls in such a manner that a maximum amount of filtering material may be utilized, and whereby the passage of air is permitted over an entire surface of each of the walls.

The invention also contemplates the provision of an oil filtering element carrying a plurality of heat dissipating fins thereon.

It is also an object of this invention to provide a new and novel method of treating a lubricant while the same is in use, or during its passage from one part of an apparatus to another.

While some of the more salient features, characteristics, and advantages of a device embodying this invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a plan sectional view through an oil filtering and cooling device embodying principles of the present invention.

Figure 2 is a vertical sectional view taken substantially as indicated by the line II—II of Figure 1.

Figure 3 is a plan sectional view similar to Figure 1, but showing a device of slightly different construction.

Figure 4 is a vertical sectional view taken substantially as indicated by the line IV—IV of Figure 3.

Figure 5 is a plan sectional view similar to Figures 1 and 3, but showing a still different type of construction.

Figure 6 is a vertical sectional view taken substantially as indicated by the slightly staggered section lines VI—VI of Figure 5.

As shown on the drawings:

With reference now to Figures 1 and 2, it will be seen that one embodiment of the present invention selected for illustration includes a casing comprising a pair of spaced cylindrical walls, in this instance an inner wall 10 and an outer wall 11.

For expeditious manufacture, the walls are preferably formed substantially flat and then rolled into their circular shape until the ends overlap as at 12 and 13 respectively, the ends being secured by brazing, spot-welding, or in any other suitable manner. For the purpose of quickly dissipating heat, each of the walls 10 and 11 is provided with a plurality of fins 14 and 15 respectively, formed in each instance by reverse bends in the material forming the walls, the ends of the fins being preferably welded or otherwise treated to prevent leakage in the event any of the bent portions become spread apart. All of the fins extend substantially the entire length of the casing, and it will be noted with reference to Figure 1 that the fins 14 on the inner wall 10 extend radially inwardly, while the fins 15 on the outer wall 11 extend substantially radially outwardly.

The space between the walls is closed at each end thereof by means of a cap 16 provided with portions 17 thereon which are inwardly bent between the fins 14 and 15 to insure the sealing of the casing. The caps 16, as will be noted, are not discs but rings, so that the completed casing is in the form of a double-walled cylinder which permits the passage of air over an entire surface of each of the walls, or, in other words, air may pass over the outside surface of the wall 11 and over the inside surface of the wall 10, which air contacting with the fins 14 and 15 causes the heat within the casing to be very quickly dissipated.

At spaced intervals within the casing, that is, within the chamber between the walls, transverse spiders 18 are secured in any desired manner, these spiders being notched to provide radially extending tongues 19, and the spiders are further arcuately notched as at 20 (Figure 1) to prevent an accumulation of the fluid or lubricant adjacent each spider. A filtering medium 21, preferably of cotton flannel with a smooth inner surface, is fluted into the notches between the tongues 19 on the respective spiders, whereby a considerable length of filtering material may be incorporated in the filter unit. This filter medium is overlapped on the exterior side of the end spiders as indicated at 22 (Figure 2) where it is firmly held in position by the compression of the end caps 16.

In a suitable aperture through the upper end cap 16, a shouldered inlet plug 23 is mounted, this plug being internally threaded in the upper region thereof as at 24 for securement to a lubricant or oil conduit. The inlet plug 23 extends somewhat into the interior of the casing and the filtering fabric is folded over as at 25 so that any fluid entering through the plug 23 will be on the outside of the filtering element. This particular plug 23 is provided with a suitable ball check valve 26 held in place by a spring 27 to render this particular filtering unit suitable for connection in a system where only a portion of the lubricant or oil is passed through the filter at a time, in other words, some of the lubricant is passed straight to the working part and the other portion of the lubricant is bypassed through the filtering element, but it is obvious that, if so desired, the check valve structure may be omitted.

Substantially diametrically opposed to the inlet plug 23 and mounted in a suitable aperture in the opposite end cap 16 is an outlet plug 28 internally threaded in the outer portion thereof for connection to an oil or lubricant conduit. It will be noted that the inner end of the outlet plug 28 communicates with the interior of the casing upon the inside of the filtering element 21 so that the oil or lubricant must pass through the filtering element in its travel from the inlet plug 23 to the outlet plug 28.

It will be apparent that while the oil or lubricant is passing through the filtering unit, it is simultaneously cooled by the passage of air through the central region of the filtering casing along the fins 14 and over the outer region of the filter casing along the fins 15, and the heat dissipating quality of the fins 14 and 15 results in a marked lowering of the temperature of the oil so that oxidization of the filtering fabric is effectively prevented, and the viscosity of the oil is restored to normal in the event the same has become lessened.

Of course it is to be understood that although the filter unit is shown in cylindrical shape, the same can obviously be made in any desired polygonal or other shape without departing, in any manner, from the spirit of the invention.

In Figures 3 and 4, I have shown a filter unit which, while embodying all of the principles of the unit shown in Figures 1 and 2, departs from the first described unit in certain structural details. The unit shown in Figures 3 and 4 comprises a casing of the same general shape as that shown in Figures 1 and 2, defined by an inner wall 30 and an outer wall 31, these walls being provided with a plurality of fins 32 and 33, respectively. In this instance, however, the fins, while being formed by reverse bends in the material forming the walls, are not completely closed, but a space 34 is left between the walls of each fin. The space between the walls 30 and 31 is closed at each end thereof by means of a cap 35 which is provided with inwardly bent portions 36 disposed between the fins 32 and 33, but which caps are each also provided with outwardly extending fingers 37 overlying the ends of the fins.

In this instance, for properly holding a filtering medium a plurality of inwardly extending fins or guiding strips 38 is provided, there being one strip clamped between the sides of each alternate fin 32, these strips extending outwardly to a point near the wall 31 and likewise an inwardly extending guiding strip is clamped between the sides of each alternate fin 33, each inwardly extending guiding strip being disposed between a pair of outwardly extending guiding strips. A filtering medium 39 of any desired material is fluted in a zigzag manner around the edges of the various guiding strips 38. As seen more clearly in Figure 4, an inlet plug 40 is mounted in a suitable aperture in the upper end wall 35 and communicates with the interior of the casing on the outside of the filtering medium 39, and an outlet plug 41 is mounted in a suitable aperture in the other end wall 35 substantially diametrically opposed to the plug 40, and communicates with the interior of the casing on the inner side of the filtering fabric 39. The results obtainable and operation of the structure shown in Figures 3 and 4 are substantially the same as that of the structure shown in Figures 1 and 2.

In Figures 5 and 6 I have shown a still different form of filter unit which also embodies the principles of that shown in Figures 1 and 2. In this particular instance, a casing of the same general shape as that previously described herein is utilized, and comprises an inner wall 42 and an outer wall 43, each of these walls being provided with a plurality of integral fins 44 and 45 respectively. However, each of the fins 44 and 45 is formed with a rather spread inner portion 46 and a narrowed outer portion 47, whereby the capacity of the filter unit is increased and also the heat dissipating surfaces are increased.

In the same manner as previously described in connection with Figures 3 and 4, guiding strips 48 are clamped between the sides of the outer portion 47 of each alternate fin 44, and between the outer portion 47 of each alternate fin 45. A filtering medium 49 is fluted around the ends of the guiding strips, and in this instance is provided with additional flutes between the guiding strips whereby a maximum quantity of filtering material may be incorporated in the unit.

The filter unit is sealed in the manner previously described, except in this instance, the upper and lower caps 50 must each of necessity have substantially the same configuration as the cross sections through the casing, and these caps are brazed, welded, or otherwise secured to the ends of the casing. The upper cap 50 carries a suitable inlet plug 51 communicating within the casing outside of the filtering medium 49, and the lower cap 50 is provided with an outlet plug 52 communicating within the casing on the inner side of the filtering medium 49.

The operation and results obtained from the use of the structure shown in Figures 5 and 6 are substantially the same as the structure shown in Figures 1 and 2.

It will also be understood that, if so desired, the filter units shown in Figures 3 to 6 inclusive may be provided with check valves at either the inlet or outlet ports as desired.

From the foregoing, it will be apparent that I have provided a filtering and cooling unit highly desirable for use in connection with oil and other fuels or lubricants, which is capable of filtering an ample quantity of oil and at the same time dissipates a considerable quantity of the heat of the oil. It will also be noted that the device filters and cools the oil simultaneously and affords no restrictions other than the filter medium itself to the smooth passage of oil. It will also be apparent that the present invention exemplifies a new and novel method of treating a fuel or lubricant during the use of the same, or while the same is passing from one part of an apparatus to another, this method including the filtering of the oil and the simultaneous cooling of the oil to an extent sufficient to restore the viscosity thereof to normal in the event the viscosity has been lessened by high temperatures. Moreover, it is to be observed that the present invention is extremely durable, easy to install, and economical to manufacture.

I am aware that many changes may be made, and numerous details of construction may be varied through a wide range without departing from the principles of this invention, and I, therefore, do not purpose limiting the patent granted hereon, otherwise than is necessitated by the prior art.

I claim as my invention:

1. In a device of the character described, a casing including a pair of spaced walls having external fins formed thereon by reverse bends in the material forming the walls, internal fins clamped between the folds forming alternate fins on each wall, and a filter element fluted around said internal fins.

2. In a device of the character described, a casing including a pair of spaced walls, external fins on one of said walls formed by reverse bends in said wall, means clamped between the sides of certain of said fins and extending into the space between said walls, and a filter element held in position in said space by said means.

3. In a device of the character described, a casing including a pair of spaced walls, fins formed on one of said walls by folds in material of substantially the same character as said wall, each of said fins being shaped to provide both a relatively wide region and a relatively narrow region between the sides thereof, and filtering means between said walls.

4. In a device of the character described, a casing including a pair of spaced walls, and fins on one of said walls formed by reverse bends in said wall, each of said fins having a relatively wide space between the sides thereof in communication with the space between said walls, each of said fins also having a relatively narrow space between the sides thereof, means in the relatively narrow space of certain of said fins held by the sides thereof and extending into the space between said walls, and filtering means supported by said first mentioned means.

5. In a device of the character described, a casing including a pair of spaced walls, folds formed in one of said walls, means clamped between certain of said folds and projecting into the space between said walls, and filtering means held in position in said space by said first means.

6. In a device of the character described, a casing including a pair of spaced walls, folds formed in one of said walls, fin-like elements clamped between certain of said folds at spaced intervals and projecting into the space between said walls, and filter means fluted around said elements in said space.

In testimony whereof I have hereunto subscribed my name at Chicago, Cook county, Illinois.

KENNETH E. LYMAN.